Figure 1:
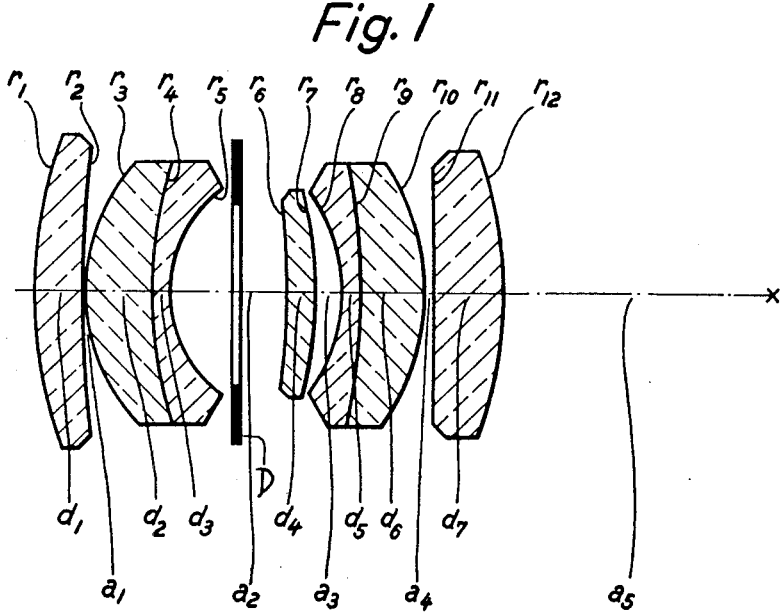

March 21, 1961     W. MANDLER ET AL     2,975,673

HIGH APERTURE PHOTOGRAPHIC OBJECTIVE

Filed Aug. 26, 1959

INVENTORS:
WALTER MANDLER & ERICH WAGNER
BY
AGENT

United States Patent Office 2,975,673
Patented Mar. 21, 1961

2,975,673
HIGH APERTURE PHOTOGRAPHIC OBJECTIVE

Walter Mandler and Erich Wagner, Midland, Ontario, Canada, assignors to Ernst Leitz Canada Ltd., Optical Works, Midland, Ontario, Canada, a company of Canada Filed Aug. 26, 1959, Ser. No. 836,195

Claims priority, application Germany Aug. 30, 1958

2 Claims. (Cl. 88—57)

The present invention relates to a high aperture photographic objective (high power objective) of the Gauss-type. Such objectives may comprise, in the direction of the incidence of light, a positive lens facing the object and a cemented negative meniscus on one side of the diaphragm, and a positive lens, another cemented negative meniscus, and another positive lens on the other side of the diaphragm between the diaphragm and a photo-sensitive surface.

The objective of this invention is a modification of the Gauss-type objective above described, with its compound negative meniscus lenses preferably having concave surfaces facing the diaphragm.

In such objectives, it is not easy to make the zone of the sagittal curvature of the field of view small. In presently available Gauss-type objectives of a focal length of 50 mm., the size of this zone is between about 0.15 mm. and 0.20 mm.

With a view to reducing the zone of the sagittal curvature of the field of view Gauss-type objectives of the indicated type have been proposed, wherein a positive lens is inserted between the two negative meniscus lenses. However, no appreciable reduction of the zone of the sagittal curvature of the field of view was accomplished with these objectives because the added positive lens must be considered as separate from the adjacent meniscus since the difference of the adjacent lens surface radii is so small that the occluded air lens has almost the same effect as a zero lens.

It is the primary object of the present invention to produce a high aperture objective of the above type, wherein the zone of the sagittal curvature of the field of view is considerably reduced and wherein the meridional component of the sagittal coma is almost completely eliminated.

The above and other objects are accomplished in accordance with this invention by forming the positive lens between the two negative meniscus lenses as a concave meniscus whose back surface has a radius at least twice as large as the radius of the adjacent front surface of the succeeding cemented negative meniscus, the focal length of this positive lens being larger than the total focal length of the objective.

Preferably, the back radius of the positive lens is about 2.4 to 2.6 times as large as the front radius of the succeeding meniscus. The focal length of the positive lens is preferably about 2 to 2.5 times the focal length of the objective.

According to one preferred embodiment of the invention, the radius of the concave surface of the cemented negative meniscus arranged between the object and the diaphragm, which faces the diaphragm, is smaller than the sum of the thickness of the positive meniscus lens and its distance from said concave surface. Preferably, the radius is between about 85% and 95% of this sum.

Throughout the specification and claims, the terms "front," "back" and "succeeding" refer to the incident and emerging lens surfaces, respectively, and to the succession of such surfaces in the direction of the incidence of light into the objective generally.

Figure 2:
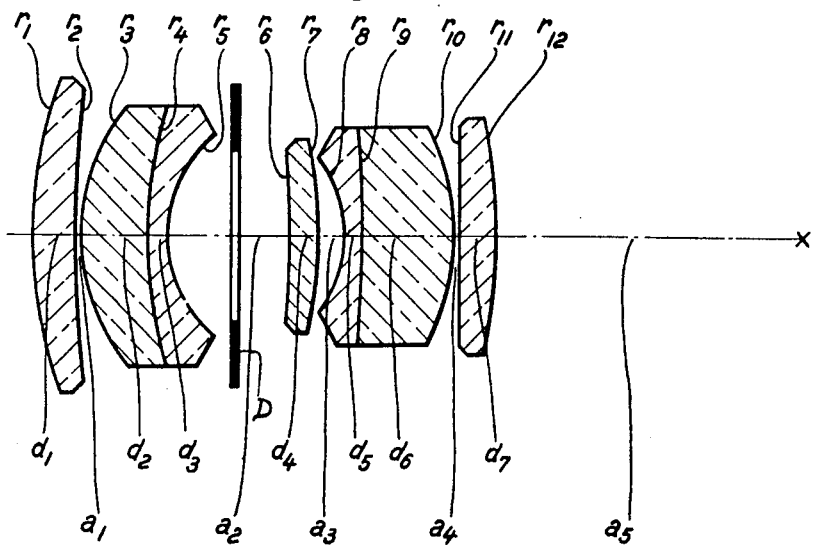

The invention will be exemplified in connection with two specific embodiments of high aperture Gauss-type photographic objectives schematically illustrated in Figs. 1 and 2 of the accompanying drawing.

The following Tables 1 and 2 correspond to the embodiments of Figs. 1 and 2, respectively, $r_1$ to $r_{12}$ indicating the radii of curvature of the objective lenses, $d_1$ to $d_7$ the thickness of the lenses, $a_1$ to $a_4$ the distance of the lenses from each other while $a_5$ indicates the distance of the last lens from the image-receiving photo-sensitive surface $x$, $n_e$ the index of refraction for the $e$-line, $\mu_e$ the coefficient of dispersion, and D the objective diaphragm.

Table 1

[Focal length $f = 1.0$   Angle of image $= 64°$   Relative aperture 1:1.4]

| | | $n_e$ | $\mu_e$ |
|---|---|---|---|
| $r_1 = + 0.84171$ | $d_1 = 0.1000$ | 1.72341 | 50.10 |
| $r_2 = + 2.5689$ | $a_1 = 0.0006$ | | |
| $r_3 = + 0.3842$ | $d_2 = 0.1297$ | 1.7899 | 48.0 |
| $r_4 = + 0.8639$ | $d_3 = 0.0374$ | 1.70444 | 29.84 |
| $r_5 = + 0.2552$ | $a_2 = 0.2309$ | | |
| $r_6 = - 1.6077$ | $d_4 = 0.0554$ | 1.7899 | 48.0 |
| $r_7 = - 0.8639$ | $a_3 = 0.0494$ | | |
| $r_8 = - 0.3448$ | $d_5 = 0.0374$ | 1.76167 | 27.34 |
| $r_9 = - 1.3714$ | $d_6 = 0.1314$ | 1.7899 | 48.0 |
| $r_{10} = - 0.4575$ | $a_4 = 0.0171$ | | |
| $r_{11} = -20.0000$ | $d_7 = 0.1371$ | 1.72056 | 47.59 |
| $r_{12} = - 0.8417$ | $a_5 = 0.5469$ | | |

Table 2

[Focal length $f = 1.0$   Angle of image $= 45°$   Relative aperture 1:1.4]

| | | $n_e$ | $\mu_e$ |
|---|---|---|---|
| $r_1 = +0.8824$ | $d_1 = 0.0894$ | 1.72056 | 47.69 |
| $r_2 = +2.7880$ | $a_1 = 0.0078$ | | |
| $r_3 = +0.3996$ | $d_2 = 0.1348$ | 1.7899 | 48.0 |
| $r_4 = +0.8984$ | $d_3 = 0.0388$ | 1.70444 | 29.84 |
| $r_5 = +0.2654$ | $a_2 = 0.2400$ | | |
| $r_6 = -1.6720$ | $d_4 = 0.0576$ | 1.7899 | 48.0 |
| $r_7 = -0.8984$ | $a_3 = 0.0514$ | | |
| $r_8 = -0.3562$ | $d_5 = 0.0388$ | 1.76167 | 27.34 |
| $r_9 = -1.9892$ | $d_6 = 0.1800$ | 1.7899 | 48.0 |
| $r_{10} = -0.4858$ | $a_4 = 0.0078$ | | |
| $r_{11} = \infty$ | $d_7 = 0.0756$ | 1.7899 | 48.0 |
| $r_{12} = -1.0658$ | $a_5 = 0.6116$ | | |

In the drawing, $r_1$ and $r_2$ constitute the front and back radii of the first positive lens, $d_1$ being its thickness, $a_1$ is the distance between the positive lens and the succeeding cemented negative meniscus composed of a lens of the thickness $d_2$ with front radius $r_3$ and back radius $r_4$ and a lens of the thickness $d_3$ with front radius $r_4$ and back radius $r_5$, the concave surface with the radius $r_5$ facing the diaphragm D. On the other side of the diaphragm and at a distance $a_2$ from the last-named concave lens surface, there is arranged the concave positive meniscus lens of thickness $d_4$ with front and back radii $r_6$ and $r_7$, succeeded at a distance $a_3$ by a cemented negative meniscus composed of a lens of the thickness $d_5$ with front and back radii $r_8$ and $r_9$ and a lens of the thickness $d_6$ with front and back radii $r_9$ and $r_{10}$, the concave surface of the meniscus with the radius $r_8$ facing the diaphragm D. The final lens between the last-named meniscus and the image-receiving surface $x$ is spaced from the meniscus by distance $a_4$, has a thickness $d_7$, and front and back radii $r_{11}$ and $r_{12}$.

While two specific examples of high aperture photographic objectives have been set forth for purposes of illustration, it should be clearly understood that many variations and modifications may occur to the skilled in the art, particularly after benefiting from the present teaching, without departing from the spirit and scope of the invention as defined in the appended claims.

We claim:

1. A high aperture photographic objective having a diaphragm and comprising, in the direction of the incidence of light, a first positive lens; a cemented negative meniscus lens between the first positive lens and the diaphragm; another cemented negative meniscus lens on the other side of the diaphragm; a positive concave meniscus lens between the diaphragm and said other cemented negative meniscus lens, the positive concave meniscus lens having a back surface with a radius which is at least twice as large as the radius of the front surface of said other cemented negative meniscus lens and a focal length which is larger than the total focal length of the objective; and a final positive lens succeeding said other cemented negative meniscus lens, said objective being characterized by the following data:

[Focal length $f=10$  Angle of image=64°  Relative aperture 1 : 1.4]

|  |  | $n_e$ | $\mu_e$ |
|---|---|---|---|
| $r_1 = +0.84171$ | | | |
| | $d_1 = 0.1000$ | 1.72341 | 50.10 |
| $r_2 = +2.5689$ | | | |
| | $a_1 = 0.0006$ | | |
| $r_3 = +0.3842$ | | | |
| | $d_2 = 0.1297$ | 1.7899 | 48.0 |
| $r_4 = +0.8639$ | | | |
| | $d_3 = 0.0374$ | 1.70444 | 29.84 |
| $r_5 = +0.2552$ | | | |
| | $a_2 = 0.2309$ | | |
| $r_6 = -1.6077$ | | | |
| | $d_4 = 0.0554$ | 1.7899 | 48.0 |
| $r_7 = -0.8639$ | | | |
| | $a_3 = 0.0494$ | | |
| $r_8 = -0.3448$ | | | |
| | $d_5 = 0.0374$ | 1.76167 | 27.34 |
| $r_9 = -1.3714$ | | | |
| | $d_6 = 0.1314$ | 1.7899 | 48.0 |
| $r_{10} = -0.4575$ | | | |
| | $a_4 = 0.0171$ | | |
| $r_{11} = -20.0000$ | | | |
| | $d_7 = 0.1371$ | 1.72056 | 47.69 |
| $r_{12} = -0.8417$ | | | |
| | $a_5 = 0.5469$ | | | wherein $r_1$ to $r_{12}$ indicate the radii of curvature of the objective lenses, $d_1$ to $d_7$ the thickness of the lenses, $a_1$ to $a_4$ the distance of the lenses from each other, $a_5$ the distance of the last lens from the image-receiving photosensitive surface $x$, $n_e$ the index of refraction, and $\mu_e$ the coefficient of dispersion.

2. A high aperture photographic objective having a diaphragm and comprising, in the direction of the incidence of light, a first positive lens; a cemented negative meniscus lens between the first positive lens and the diaphragm; another cemented negative meniscus lens on the other side of the diaphragm; a positive concave meniscus lens between the diaphragm and said other cemented negative meniscus lens, the positive concave meniscus lens having a back surface with a radius which is at least twice as large as the radius of the front surface of said other cemented negative meniscus lens and a focal length which is larger than the total focal length of the objective; and a final positive lens succeeding said other cemented negative meniscus lens, said objective being characterized by the following data:

[Focal length $f=1.0$  Angle of image: 45°  Relative aperture 1 : 1.4]

|  |  | $n_e$ | $\mu_e$ |
|---|---|---|---|
| $r_1 = +0.8824$ | | | |
| | $d_1 = 0.0894$ | 1.72056 | 47.69 |
| $r_2 = +2.7880$ | | | |
| | $a_1 = 0.0078$ | | |
| $r_3 = +0.3996$ | | | |
| | $d_2 = 0.1348$ | 1.7899 | 48.0 |
| $r_4 = +0.8984$ | | | |
| | $d_3 = 0.0388$ | 1.70444 | 29.04 |
| $r_5 = +0.2654$ | | | |
| | $a_2 = 0.2400$ | | |
| $r_6 = -1.6720$ | | | |
| | $d_4 = 0.0576$ | 1.7899 | 48.0 |
| $r_7 = -0.8984$ | | | |
| | $a_3 = 0.0514$ | | |
| $r_8 = -0.3562$ | | | |
| | $d_5 = 0.0388$ | 1.76167 | 27.34 |
| $r_9 = -1.9892$ | | | |
| | $d_6 = 0.1800$ | 1.7899 | 48.0 |
| $r_{10} = 0.4858$ | | | |
| | $a_4 = 0.0078$ | | |
| $r_{11} = \infty$ | | | |
| | $d_7 = 0.0756$ | 1.7899 | 48.0 |
| $r_{12} = -1.0658$ | | | |
| | $a_5 = 0.6116$ | | | wherein $r_1$ to $r_{12}$ indicate the radii of curvature of the objective lenses, $d_1$ to $d_7$ the thickness of the lenses, $a_1$ to $a_4$ the distance of the lenses from each other, $a_5$ the distance of the last lens from the image-receiving photosensitive surface $x$, $n_e$ the index of refraction, and $\mu_e$ the coefficient of dispersion.

References Cited in the file of this patent

UNITED STATES PATENTS

| 2,171,641 | Berek | Sept. 5, 1939 |
| 2,715,354 | Suzuki et al. | Aug. 16, 1955 |

FOREIGN PATENTS

| 456,912 | Germany | Mar. 5, 1928 |